United States Patent

Rossi

[11] Patent Number: 6,041,504
[45] Date of Patent: Mar. 28, 2000

[54] DEVICE TO PROGRESSIVELY BREAK THE WOODY SHELL, PARTICULARLY OF FRUITS OF THE DRUPE TYPE

[76] Inventor: Mario Rossi, Via Postumia, 13, Frazione Lonzago, 1-31057, Silea, Italy

[21] Appl. No.: 08/981,939
[22] PCT Filed: Jul. 5, 1996
[86] PCT No.: PCT/IT96/00138
  § 371 Date: Mar. 26, 1998
  § 102(e) Date: Mar. 26, 1998
[87] PCT Pub. No.: WO97/02779
  PCT Pub. Date: Jan. 30, 1997

[30] Foreign Application Priority Data

Jul. 7, 1995 [IT] Italy ............................... TV950039 U

[51] Int. Cl.[7] .................................................. A47J 43/26
[52] U.S. Cl. ........................................ 30/120.5; 30/120.2
[58] Field of Search ................. 30/120.4, 120.5, 30/120.2; 99/568, 573; D7/680; 452/16, 17; 81/314

[56] References Cited

U.S. PATENT DOCUMENTS

| | | | |
|---|---|---|---|
| 1,351,983 | 9/1920 | Allen et al. | 30/120.5 |
| 1,436,571 | 11/1922 | Bokor | 30/120.4 |
| 2,526,273 | 10/1950 | Rimes | 30/120.5 |
| 3,066,713 | 12/1962 | Wilcox | 30/120.5 |
| 4,641,430 | 2/1987 | Hahn | 30/120.5 |
| 4,905,350 | 3/1990 | Gardner | 30/102.4 |
| 5,351,402 | 10/1994 | Mansfield | 30/102.5 |

FOREIGN PATENT DOCUMENTS 2 265 331  10/1975  France .

*Primary Examiner*—Hwei-Siu Payer
*Attorney, Agent, or Firm*—Finnegan, Henderson, Farabow, Garrett & Dunner, L.L.P.

[57] ABSTRACT

A device for progressively breaking the woody shell on fruits of the drupe type includes a double handle, of which a first handle is static and second handle is dynamic. The first handle includes a spoon-shaped seat to hold the fruit whose shell is to be broken and the seat has a longitudinal opening along its center. The second handle is connected to the first handle by a pivot and a movable breaking blade is also connected by the pivot to the two handles. The movable breaking blade is provided with a ratchet in the form of a wheel with teeth around its periphery. The ratchet progressively moves the blade so as to surpass the spoon-shaped seat through the longitudinal opening. The blade moves in response to the dynamic handle acting on a first pawl that engages with the teeth of the wheel. The blade also includes an elastic recall which operates to return the blade to an original position when the blade is released by a second pawl provided on the first handle that engages with the teeth at a point diametrically opposite to the first pawl.

15 Claims, 1 Drawing Sheet

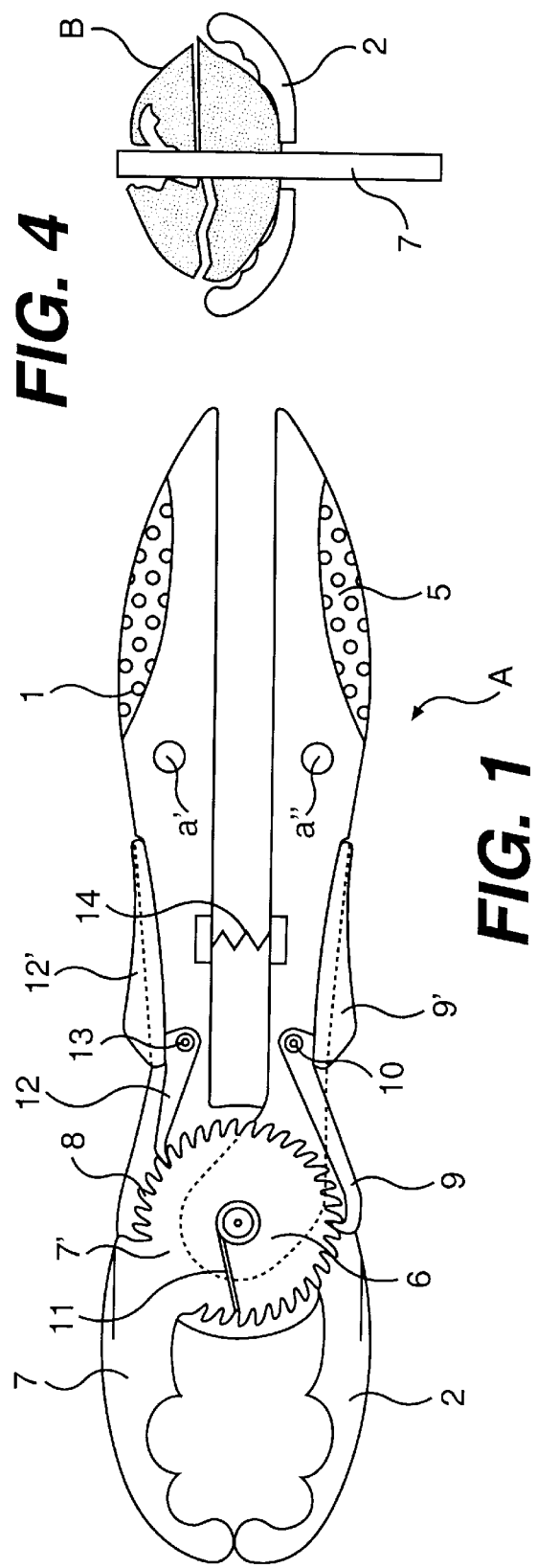
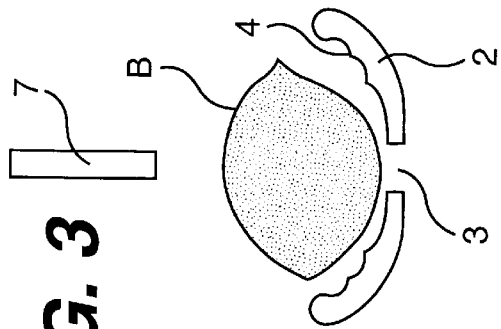
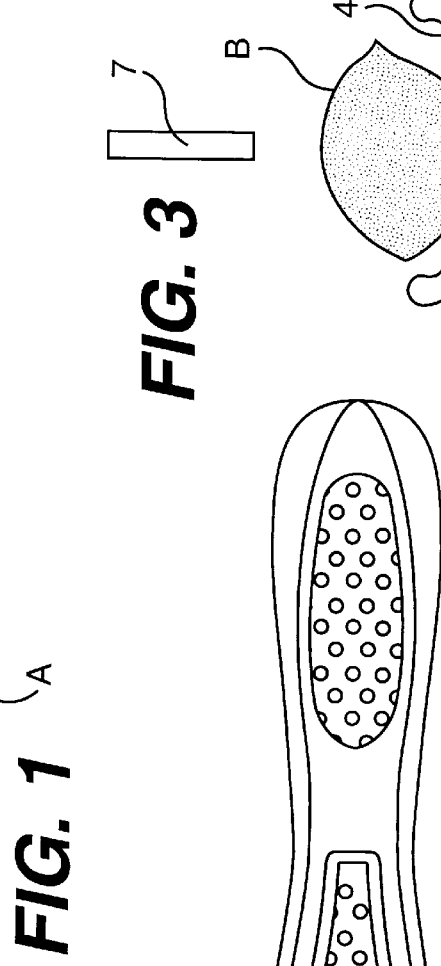
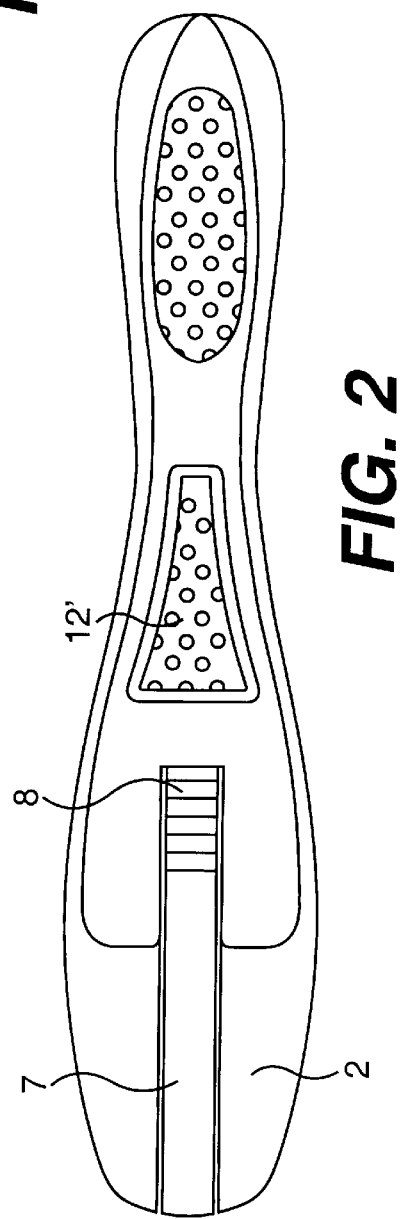

DEVICE TO PROGRESSIVELY BREAK THE WOODY SHELL, PARTICULARLY OF FRUITS OF THE DRUPE TYPE

BACKGROUND OF THE INVENTION

This invention has as an exemplary object to provide a device to progressively break the woody shell, particularly of fruits of the drupe type. For example, a walnut is a known fruit of this type.

The invention finds particular, if not exclusive, application in the field of kitchen tools and daily use household objects.

Tasty fruit is often seasoned or submitted to drying processes, so as to be classified as dried fruit. Filberts, peanuts, almonds, dates not from palms, form part of the category of foodstuffs to which this invention is directed.

A characteristic that is shared by these fruits is the fact that they are put on the market in a particular condition where, as in the case of the walnut, the hull remains as a robust woody shell that encompasses a kernel. The kernel may be an edible pseudo-pulpous mesocarp substantially dry, as in the case of walnuts.

The particular shape and fibrous structure of the shell, confers to the walnut, and other fruits and nuts of this type, a good mechanical resistance, so as to require the consumer, in order to access the kernel, to use a suitable tool, better known as a nutcracker.

Utilized in a somewhat different way around the world and generally known, the nutcracker belongs to the family of kitchen tools having substantially remained unaltered in their structure. Changes are sometimes observed in these nutcrackers, specifically with respect to the design, or alternatively in the use of plastic materials in place of more common materials, such as metal.

A nutcracker of the conventional type is essentially made up of two specular, or mirror-image, levers having a kind of jaw, hinged to a common end. Each lever includes on the inside face a shape so as to be subdivided into two parts, respectively. A first part is next to the hinging and is used to vice part of the fruit, and a second part comprises part of the handle.

In more detail, each lever can have a slightly arched shape, in such a way that along the upper surface of the second part, a convenient grip surface is located, often knurled and somewhat extended. Such a surface may also be obtained by applying, in a wrapping way, a non-skid plastic material to the grip surface.

Along the inside faces of the two levers so coupled, and in proximity to the hinging, each lever has a hemispherical shape, again specular to each other. In some cases each face has a certain thickness, such that when reapproached toward each other, they define substantially the outline of a small walnut. Variations of the known device can include the presence of a second hemisphere adjacent to the first and generally of smaller size to allow the breakage of a dry fruit shell of another size.

Finally, a toothing may be provided along the border of both the clamping hemispheres, with the purpose being to confer a greater grip capacity followed by a breakage of the shell.

Thus, the consumer, to use this nutcracker, must open the two levers, an operation generally conducted with two hands, introduce the walnut or other fruit in the suitable seat, maintain the nutcracker open with one hand and then close the two levers so as to steadily hold the walnut or fruit. At this point, by progressively applying increasing force, the consumer achieves the breakage of the shell and a total reapproach of the two opposed hemispheres occurs.

The drawbacks of the currently employed solution are known. First, the fact that in order to compress the walnut with force, often one is not able to control the intensity. Additionally, because the giving-in of the shell is almost sudden, the complete reapproach of the two levers occurs. This condition, in the best of situations, results in a crack of the kernel also, which, because of the fact that it is dry, tends to shatter in small pieces of pulp mixed with the fragments of the shell. The consumer, therefore, must select one by one the more evident edible parts, throwing away all the rest.

Other than the obvious waste that results, the available tools for household use today do not allow for maintaining the kernel intact, which one may require in order to garnish a cake or the like. Therefore, the current device does not function to achieve aesthetic results either.

A second drawback is due to the fact that in certain cases the shells are indeed resistant, to such an extent that a bending of the respective levers in the compression phase occurs without obtaining any breakage. In that case, the consumer must resort to the use of two hands, with the fingers open and one opposite the other, in order to exert a greater force, as is the case, for example, of persons who are generally weaker, such as the elderly and women. The result, in conclusion, is a more uncontrolled giving-in of the shell, again fragmenting the kernel into numerous small pieces.

A third, but not final, drawback is due to the excessive opening imposed by the nutcracker when the respective jaws have viced the fruit. The difficulty in exerting the force necessary to break the shell appears therefore inherent, as this must be accomplished through action of the fingers alone, specifically thumb-index, without using the whole palm of the hand. In the case of small hands, for example children's hands, breaking the nuts will result in an operation more difficult than anticipated. Thus, it is necessary to resort to the use of two hands, as discussed above. Alternatively, the device could be gripped in proximity to the hinging, but this presents the danger of injury to the fingers.

SUMMARY OF THE INVENTION

One object of this invention is to avoid the above-mentioned drawbacks.

This and other objects are reached with this invention according to the characteristics as in the included claims, solving the arising problems with a device for progressively breaking the woody shell, particularly of fruits of the drupe type. The device, in a preferred embodiment, includes a first handle having a seat to contain a nut and a second handle moveably connected to the first handle. A breaking blade is moveably connected to the handles and a ratchet progressively moves the breaking blade toward the seat.

In this way, through the important creative contribution, the effect of which realizes an immediate technical progress, different advantages are achieved.

First, the inventive device allows the consumer to carry out the correct breakage of the shell, for example a walnut shell, by modulating the force exerted on the handle of the jaw. Consequently, aside from a good stability and breaking precision, the device achieves a greater safeguarding of the structural integrity of the kernel, avoiding the fragmentation (maintaining in good part the original aesthetic aspect) and any waste of edible parts.

Additionally, it is not necessary to apply excessive forces, therefore being utilizable by weaker persons, and also particularly easy to use as well as easy to grip.

Finally, considering the particular design of the structure, it offers itself as an exclusive object for a gift.

These and other advantages will appear from the following specific description of a preferred embodiment, with the help of the enclosed schematic drawings whose details should not be intended as limitative but rather illustrative.

BRIEF DESCRIPTION OF THE DRAWINGS

FIG. 1 is a side view of a nutcracker of the present invention.

FIG. 2 is a top view of the nutcracker shown in FIG. 1, in the same operative condition.

FIGS. 3 and 4 are, respectively, frontal views of the two main functional sequences of the inventive device.

DESCRIPTION OF THE PREFERRED EMBODIMENT

In FIGS. 1 and 2 of the drawings, there is shown a device (A) for breaking, progressively, the woody shell, particularly of fruits of the drupe type (B), including a double handle (a', a"), of which there is a first handle (a') that is static and a second handle (a") that is dynamic.

In more detail, on one end (1) of the first handle (a') is a generous sized grip surface, which may be formed anatomically in shape. On the other end a spoon-shaped seat (2) is provided to contain a fruit or nut. The seat (2) is essentially divided along its middle by a longitudinal opening (3). The spoon shape, in practice, offers a convenient seat to hold the fruit (B) to be submitted to breakage of its shell. Along its internal surface, seat (2) is provided with a series of ribs or slots (4) in order to simplify clamping.

The second handle (a") is of the dynamic type, including on one end (5) a handle that is specular to the portion of the first handle (a') comprising the grip surface (1). On the other end is located a pivot (6) to hinge to said first handle (a') substantially over its barycentre. The pivot (6) is placed on the first handle between the end having the grip surface (1) and the starting of the spoon-shaped seat (2). A function of the pivot (6) is also to connect a movable breaking blade (7) to the handles (a', a"). The blade (7) is made of a head portion and a ratchet (7'). The head of breaking blade (7) has a certain width closest to the pivot (6) and ends in a substantially tapered width. The shape of the blade (7) is slightly curved and ribs or slots are provided on a surface facing the seat.

The part of blade (7) that is so connected to the handles (a', a") allows the blade to rotate independently from the second handle (a"). At the pivot (6), blade (7) includes the ratchet essentially made up of wheel (7') provided with teeth (8) on its periphery. On teeth (8) engages a first pawl (9), which has an elastic recall, i.e. it is spring-biased, so as to return pawl (9) to an original position when external forces are removed therefrom. First pawl (9) is hinged at pin (10) on second handle (a"). On the other side of pin (10) is an extension (9') of pawl (9) so as to form a lever, which allows, by simple pressure on extension (9'), the disengagement of pawl (9) from teeth (8).

A second pawl (12) is hinged on pin (13) of first handle (a') and engages almost diametrically opposite to first pawl (9) on corresponding teeth (8) of wheel (7'). Second pawl (12) also has an elastic recall to return the pawl to an original position when external forces are removed therefrom. Additionally, on the opposite side of pin (13) from wheel (7') is an extension (12') forming a lever for disengagement of second pawl (12) from wheel (7'). When second pawl (12) is disengaged, wheel (7') is released and a recall mechanism (11) works to return wheel (7') to its original position.

Finally, between the two handles (a', a") is provided compression spring (14), whose ends are anchored along the facing sides of handles (a', a").

In operation, the inventive device works in the following manner. By pressing on either both extension (12') formed with pawls (12), second pawl (12) is disengaged from teeth (8). Blade (7) thus rotates upward due to its independence from the handles and due to its recall mechanism (11) which returns it to its original, upward position. An opening that can fit a fruit of the drupe type is formed and the fruit whose shell is to be broken can be placed on spoon-shaped seat (2).

The ratchet of the present invention operates substantially in the typical fashion that conventional ratchet mechanisms operate. It is the operation of the ratchet that imparts progressive downward movement to blade (7) and thus causes breakage of the shell. Specifically, upon squeezing handles (a', a") together, second handle (a") moves because it is dynamic while first handle (a') remains stationary because it is static. The movement of second handle (a") in turn acts on first pawl (9) engaged with teeth (8). Such movement of pawl (9) imparts slight movement to wheel (7') due to the engagement and thus in turn to blade (7) before pawl disengages with teeth (8) due to further movement of handle (a"). Upon release of dynamic handle (a"), the elastic recall of pawl (9) creates an alternating movement to pawl (9) and causes it to reengage with teeth (8) of wheel (7'), again imparting additional movement to wheel (7') and blade (7) as pawl (9) returns to its original position. The motion of blade (7) is furthered with repeated squeezing and release of handles (a', a") until blade (7) surpasses spoon-shaped seat (2) through longitudinal opening (3), thereby causing the desired breakage of the shell.

What is claimed is:

1. A nutcracker comprising:

a first handle having a seat for receiving a nut;

a second handle moveably connected to said first handle;

a breaking blade moveably connected to said handles;

a ratchet connected to the handles and the breaking blade for progressively moving said breaking blade toward the seat upon relative movement of the first and second handles; and wherein said seat is substantially spoon-shaped and provided with a longitudinal opening through which said blade is adapted to pass.

2. A nutcracker comprising:

a first handle having a seat for receiving a nut;

a second handle moveably connected to said first handle;

a breaking blade moveably connected to said handles; and a ratchet wheel connected to the handles and the breaking blade for progressively moving said breaking blade toward the seat upon relative movement of the first and second handles.

3. The nutcracker of claim 2, wherein the first handle has a grip surface on one end thereof and terminates in said seat on the other end thereof.

4. The nutcracker of claim 2, wherein the first handle, the second handle, and the blade are connected by a pivot.

5. The nutcracker according to claim 2, wherein a compression spring is provided between the first handle and the second handle, said compression spring having two ends, with each end anchored along facing sides of the first handle and the second handle, respectively.

6. A nutcracker comprising:

a first handle having a seat for receiving a nut;

a second handle moveably connected to said first handle;

a breaking blade moveably connected to said handles;

a ratchet connected to the handles and the breaking blade for progressively moving said breaking blade toward the seat upon relative movement of the first and second handles; and wherein clamping ribs or slots are provided along surfaces of said seat and said breaking blade that face each other.

7. A nutcracker comprising:

a first handle having a seat for receiving a nut;

a second handle moveably connected to said first handle;

a breaking blade moveably connected to said handles;

a ratchet connected to the handles and the breaking blade for progressively moving said breaking blade toward the seat upon relative movement of the first and second handles; and wherein said blade includes a slightly curved head at one end thereof and the ratchet at the other end thereof.

8. The nutcracker of claim 7, wherein said blade is spring-biased in an upward position.

9. A nutcracker comprising:

a first handle having a seat for receiving a nut;

a second handle moveably connected to said first handle;

a breaking blade moveably connected to said handles;

a ratchet connected to the handles and the breaking blade for progressively moving said breaking blade toward the seat upon relative movement of the first and second handles; and wherein said ratchet includes a wheel having peripheral teeth.

10. The nutcracker of claim 9, further comprising a first pawl moveably connected to said second handle and adapted to engage with said ratchet so as to progressively move said blade toward the seat when said second handle is moved.

11. The nutcracker of claim 10, further comprising a second pawl moveably connected to said first handle and adapted to engage said ratchet at a location opposite the first pawl such that when said second pawl is released from engagement with said ratchet, the blade moves upwardly.

12. The nutcracker of claim 11, wherein said pawls include levers adapted to pivotably move said pawls to engage and disengage said pawls from said ratchet.

13. The nutcracker of claim 11, wherein said first and second pawls are spring-biased toward said ratchet.

14. The nutcracker of claim 13, wherein said blade is spring-biased in an upward position.

15. The nutcracker of claim 14, wherein said first handle terminates in said seat, said seat being essentially spoon-shaped and provided with a longitudinal opening through which said blade is adapted to pass.

* * * * *